United States Patent
Shanbhag et al.

(10) Patent No.: US 7,031,383 B2
(45) Date of Patent: Apr. 18, 2006

(54) COMPENSATION CIRCUIT FOR REDUCING INTERSYMBOL INTERFERENCE PRODUCTS CAUSED BY SIGNAL TRANSMISSION VIA DISPERSIVE MEDIA

(75) Inventors: Abhijit G. Shanbhag, San Jose, CA (US); Abhijit M. Phanse, Santa Clara, CA (US)

(73) Assignee: Scintera Networks, Inc., San Jose, CA (US)

( * ) Notice: Subject to any disclaimer, the term of this patent is extended or adjusted under 35 U.S.C. 154(b) by 349 days.

(21) Appl. No.: 10/117,293

(22) Filed: Apr. 5, 2002

(65) Prior Publication Data

US 2003/0189996 A1    Oct. 9, 2003

(51) Int. Cl.
*H03H 7/30* (2006.01)
*H03H 7/40* (2006.01)
*H03K 5/159* (2006.01)

(52) U.S. Cl. ........................ 375/233; 375/232
(58) Field of Classification Search ........ 375/229–236, 375/340, 341, 346, 345; 714/795
See application file for complete search history.

(56) References Cited

U.S. PATENT DOCUMENTS

| | | | |
|---|---|---|---|
| 5,191,462 A | | 3/1993 | Gitlin et al. |
| 5,561,687 A | * | 10/1996 | Turner .................. 375/233 |
| 5,692,011 A | * | 11/1997 | Nobakht et al. ........ 375/233 |
| 5,748,674 A | * | 5/1998 | Lim ..................... 375/233 |
| 6,009,120 A | * | 12/1999 | Nobakht ................ 375/229 |
| 6,012,161 A | * | 1/2000 | Ariyavisitakul et al. .... 714/795 |
| 6,088,389 A | | 7/2000 | Larsson |
| 6,185,250 B1 | | 2/2001 | Wang et al. |
| 6,226,323 B1 | * | 5/2001 | Tan et al. ............. 375/233 |
| 6,240,133 B1 | | 5/2001 | Sommer et al. |
| 6,438,164 B1 | * | 8/2002 | Tan et al. ............. 375/233 |
| 6,563,812 B1 | * | 5/2003 | De ....................... 370/342 |
| 6,668,014 B1 | * | 12/2003 | Endres et al. ........ 375/232 |

OTHER PUBLICATIONS

Proakis, Chapter 10-Communication Through Band-Limited Linear Filter Channels, Digital Communications, Fourth Edition, 2001, pp. 598-659, McGraw-Hill, New York, NY.
Proakis, Chapter 11-Adaptive Equalization, Digital Communications, Fourth Edition, 2001, pp. 660-708, McGraw-Hill, New York, NY.

* cited by examiner

*Primary Examiner*—Stephen Chin
*Assistant Examiner*—Curtis Odom
(74) *Attorney, Agent, or Firm*—Vedder Price Kaufman & Kammholz, P.C.

(57) ABSTRACT

A compensation circuit for reducing intersymbol interference (ISI) products within an electrical data signal corresponding to a detected data signal received via a signal transmission medium provides for selective application of compensation to individual, discrete data signal components. According to one embodiment, one circuit branch processes the electrical data signal to substantially remove one distinct signal component representing an ISI product of some portion of the data symbol sequence. A second circuit branch approximately duplicates an ISI product of another portion of the data symbol sequence for removal by subtraction within a signal combiner from the compensated signal provided by the first circuit branch. A third circuit branch approximately duplicates an ISI product of still another portion of the data symbol sequence also for removal by subtraction within the signal combiner from the compensated signal provided by the first circuit branch.

32 Claims, 5 Drawing Sheets

COMPENSATION CIRCUIT FOR REDUCING INTERSYMBOL INTERFERENCE PRODUCTS CAUSED BY SIGNAL TRANSMISSION VIA DISPERSIVE MEDIA

BACKGROUND OF THE INVENTION

1. Field of the Invention

The present invention relates to signal transmission and detection, and in particular, to techniques for compensating for signal distortions caused by signal dispersion and non-linearities within the signal transmission media.

2. Description of the Related Art

Figure 1:
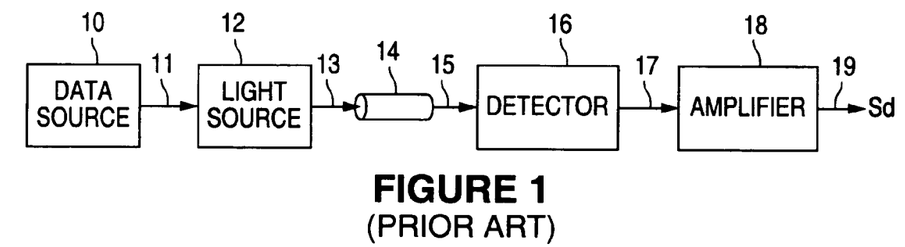
FIG. 1 is a functional block diagram of a conventional fiber optic signal system.

Referring to FIG. 1, a conventional fiber optic signal system includes a data source 10, a light source (e.g., a laser) 12, the fiber optic medium 14, a signal detector (e.g., photodetector) 16 and an amplifier (e.g., transimpedance) 18, interconnected substantially as shown. The data source 10 provides a stream, or sequence, of data symbols 11 which modulate the light source 12 which, in turn, launches an optical signal 13 into the optical fiber 14. (Typically each data symbol consists of a single data bit.) At the reception end of the fiber 14, the optical signal 15 is received and detected by the detector 16, with the resultant signal 17 being amplified by the amplifier 18 to produce the electrical data signal 19 representing the sequence of data symbols. This signal 19 is then processed by clock and data recovery ("CDR") circuitry (not shown) to recover the actual data and associated clock signals.

The detector 16 is typically some form of a direct detector, such as a photodetector. As is well known, the photodetector detects the modulated light forming the optical signal and, based on the amount of photonic energy in the optical signal, generates an electrical current signal corresponding to that photonic energy. Accordingly, the amplitude of the electrical current signal so generated varies in linear proportion to the received optical signal power since the amplitude of the current is proportional to the square of the optical signal amplitude.

Figure 2:
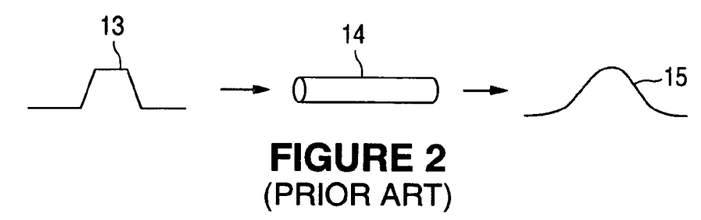
FIG. 2 illustrates how the dispersion effects of an optical fiber produce distortion within the optical data signal.

It is well known that the bit rate of the data signal 11, as well as the length of the optical fiber 14, are limited in terms of how reliably a transmitted data can be received and accurately detected, due to the non-ideal characteristics of the fiber optic transmission medium 14. Referring to FIG. 2, for example, it is well known that an input data symbol 13, after propagating through the optical fiber 14, emerges as an optical signal 15 displaying a certain amount of signal dispersion. The amount of the signal dispersion increases in a manner corresponding to increases in the bit rate of the data signal 11 and length of the optical fiber 14.

One form of dispersion is chromatic dispersion which has a linear delay versus frequency characteristic. However, with direct optical signal detection, such as that done when using a photodetector, chromatic dispersion causes nonlinear distortions in the electrical signal of the receiver. Simple conventional linear equalization techniques are not adequate for compensating for such dispersion.

Figure 3A:
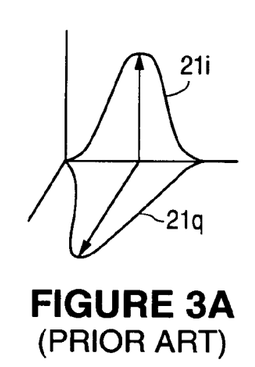
FIGS. 3A–3C illustrate effects of polarization mode dispersion within an optical fiber.
Figure 3B:
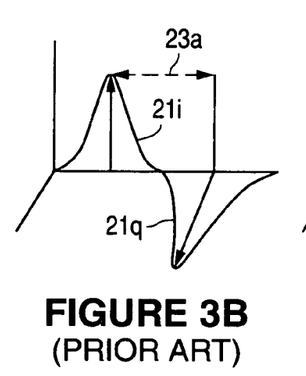
Figure 3C:
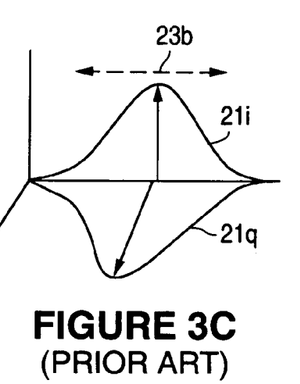

Referring to FIGS. 3A–3C, another form of dispersion is polar, or polar mode, dispersion. As shown in FIG. 3A, an optical signal transmitted through a single mode optical fiber actually transits light in two distinct polarization modes $21i$, $21q$. As is well known, the electrical fields of these two modes $21i$, $21q$ are orthogonal to each other. As the optical signal travels through the optical fiber 14, these two signal modes $21i$, $21q$ become misaligned, as shown in FIG. 3B. The amount of dispersion, or distance, $23a$ between these two modes $21i$, $21q$ is dependent upon how asymmetrical certain characteristics of the optical fiber 14 are. For example, this dispersion 23 will increase in relation to the degree to which the refractive indices for each of the polarization modes $21i$, $21q$ differ from each other within the optical fiber 14.

Referring to FIG. 3C, such asymmetrical characteristics of the optical fiber 14 tend to vary randomly along the fiber 14. Additionally, the optical signal can sometimes shift randomly between the polarization modes, thereby causing the phase shift between the two polarization modes to not accumulate consistently along the length of the optical fiber 14. Accordingly, the pulse duration $23b$ becomes stretched in time.

With polarization dispersion occurring in addition to chromatic dispersion, simple linear equalization techniques become even less effective as well as less practical due to the increasing complexity of the equalization circuitry necessary for compensation.

Figure 4:
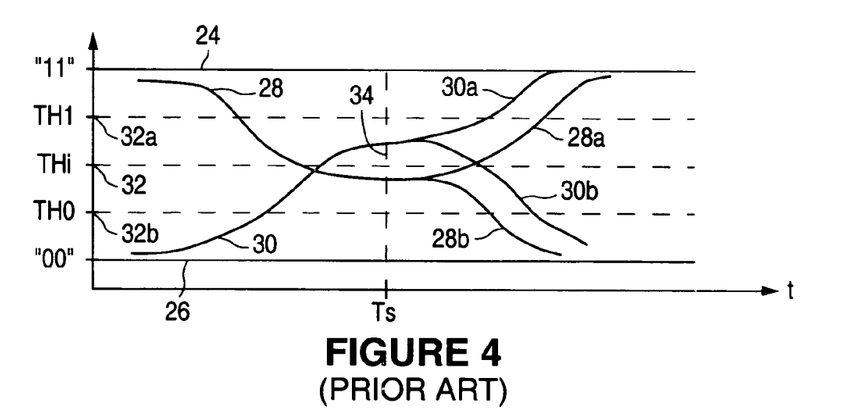
FIG. 4 illustrates relationships between detected signal values and signal detection thresholds.

Referring to FIG. 4, the effect that such signal dispersion characteristics have upon the detected data signal can be better understood. As discussed above, the data signal consists of data symbols in the form of individual data bits. For this binary form of signal it is assumed that a binary value of unity (1) appears as a "high" signal value and a binary value of zero (0) appears as a "low" signal value at the output 17 of the detector 16 (or output 19 of the amplifier 18). However, consistent with the foregoing discussion, the dispersion effects of the optical fiber 14 are such that the value of the detected signal fails to achieve these ideal signal values due to the intersymbol interference ("ISI") caused by the dispersion effects upon adjacent data bits as well as the present or desired data bit.

For example, let it be assumed that two adjacent data bits each have binary values of unity. Accordingly, this will produce the maximum signal value 24. Conversely, two adjacent data bits having binary values of 0 will produce the minimum signal value 26. Data bit pairs of "01" or "10" will produce signal values which are somewhere between these maximum 24 and minimum 26 values.

For example, following a bit value of unity, the signal value 28 will decrease and then either increase as value $28a$ or continue to decrease as value $28b$ when the value of the immediately subsequent data bit is unity or zero, respectively. Similarly, following a data bit value of zero, the signal value 30 will increase and then either continue to increase as value $30a$ or decrease as value $30b$ when the subsequent data bit has a value of unity or 0, respectively.

For purposes of this example, it is further assumed that the second bit of this bit pair is the transmitted bit intended for detection during the signal detection interval, centered about time Ts. By observing the signal at this time Ts, and comparing it to a threshold TH, a decision is made as to whether the signal level indicates a bit value of either unity or 0. However, as seen in FIG. 4, due to the dispersion effects and resulting ISI, there is a gap 34, referred to as the signal "eye", between the possible signal values. As a result, incorrect decisions may be made as to the unity or zero value of the detected signal at time Ts.

Frequently, a fixed threshold value 32 is used for making this decision. The problem with this conventional approach, is that if the distortion affects cause the opening of the signal eye to not be centered about this threshold value 32 then the signal value will be incorrectly detected.

One conventional technique for compensating for this problem is to increase the effective size of the signal eye, thereby increasing the potential distance between detected signals representing values of unity and 0. Such technique uses a feedback signal to modify, e.g., increase or decrease as appropriate, the electrical signal 17/19 (FIG. 1) by shifting the signal wave for maximum 24 and minimum 26 levels up or down so that the effective threshold values 32a, 32b appear halfway between them. However, while this may be effective at low data rates, it becomes significantly less effective at high data rates.

Another conventional technique has been to modify the threshold, rather than modify the detected signal. With reference to FIG. 4, this would be done by shifting the threshold 32 in accordance with what the immediately preceding adjacent data bit value was. For example, if the immediately preceding adjacent data bit had a value of unity or zero, the effective threshold would be shifted to a higher 32a or lower 32b value, respectively.

While these techniques can be somewhat effective, such techniques do nothing to remove distortion from the data signal. Instead, such techniques merely use information about the distortion in an attempt to achieve an approximately equivalent, but inferior, effect.

Accordingly, it would be desirable to have a compensation technique for reducing ISI products by more directly compensating for the individual ISI products.

SUMMARY OF THE INVENTION

In accordance with the presently claimed invention, a compensation circuit for reducing ISI products within an electrical data signal corresponding to a detected data signal received via a signal transmission medium introduces distinct compensation effects for individual ISI products within the electrical data signal. Distinct data signal components within the detected data signal and corresponding to such ISI products can be selectively and individually compensated, thereby producing a compensated data signal in which each selected one of such individual data signal components is substantially removed. Individual data signal components or selected combinations of data signal components can be compensated as desired.

In accordance with one embodiment of the presently claimed invention, a compensation circuit for reducing intersymbol interference (ISI) products within a data signal, includes input and output terminals, adaptive equalization circuitry and output processing circuitry. The input terminal conveys an input data signal including a first plurality of ISI products and corresponding to a detected data signal received via a signal transmission medium. The output terminal conveys an output data signal including a second plurality of ISI products which is smaller than the first plurality of ISI products. The adaptive equalization circuitry, coupled to the input terminal, adaptively equalizes the input data signal to provide an equalized signal. The output processing circuitry, coupled between the adaptive equalization circuitry and the output terminal, processes the equalized signal to provide the output data signal.

In accordance with another embodiment of the presently claimed invention, a compensation circuit for reducing intersymbol interference (ISI) products within a data signal, includes input and output terminals, adaptive equalization circuitry, signal combining circuitry and output processing circuitry. The input terminal conveys an input data signal including a first plurality of ISI products and corresponding to a detected data signal received via a signal transmission medium. The output terminal conveys an output data signal including a second plurality of ISI products which is smaller than the first plurality of ISI products. The adaptive equalization circuitry, coupled to the input terminal, adaptively equalizes the input data signal to provide an equalized signal. The signal combining circuitry, coupled to the adaptive equalization circuitry, receives and subtracts a processed signal from the equalized signal to provide a resultant signal. The output processing circuitry, coupled between the signal combining circuitry and the output terminal, processes the resultant signal to provide the output signal and the processed signal.

In accordance with a related embodiment, the output processing circuitry includes adaptive signal slicing circuitry and nonlinear processing circuitry. The adaptive signal slicing circuitry, coupled between the signal combining circuitry and the output terminal, slices the resultant signal to provide a sliced signal as the output signal. The nonlinear processing circuitry, coupled between the output terminal and the signal combining circuitry, nonlinearly processes at least a portion of the sliced signal to provide the processed signal.

In accordance with another embodiment of the presently claimed invention, a compensation circuit for reducing intersymbol interference (ISI) products within a data signal, includes input and output terminals, adaptive equalization circuitry, equalization and processing circuitry, signal combining circuitry and output processing circuitry. The input terminal conveys an input data signal including a first plurality of ISI products and corresponding to a detected data signal received via a signal transmission medium. The output terminal conveys an output data signal including a second plurality of ISI products which is smaller than the first plurality of ISI products. The adaptive equalization circuitry, coupled to the input terminal, adaptively equalizes the input data signal to provide an equalized signal. The equalization and processing circuitry, coupled between the input and output terminals, selectively equalizes and processes the input data signal and at least a portion of the output signal to provide a processed signal. The signal combining circuitry, coupled to the adaptive equalization circuitry and the equalization and processing circuitry, receives and subtracts the processed signal from the equalized signal to provide a resultant signal. The output processing circuitry, coupled between the signal combining circuitry and the output terminal, processes the resultant signal to provide the output signal.

In accordance with a related embodiment, the output processing circuitry includes adaptive signal slicing circuitry, coupled between the signal combining circuitry and the output terminal, that slices the resultant signal to provide a sliced signal as the output signal.

In accordance with another embodiment of the presently claimed invention, a compensation circuit for reducing intersymbol interference (ISI) products within a data signal, includes input and output terminals, signal combining circuitry and output processing circuitry. The input terminal conveys an input data signal including a first plurality of ISI products and corresponding to a detected data signal received via a signal transmission medium. The output terminal conveys an output data signal including a second plurality of ISI products which is smaller than the first plurality of ISI products. The signal combining circuitry, coupled to the input terminal, receives and subtracts a processed signal from the input data signal to provide a resultant signal. The output processing circuitry, coupled between the signal combining circuitry and the output terminal, processes the resultant signal to provide the output signal and the processed signal.

In accordance with a related embodiment, the output processing circuitry includes adaptive signal slicing circuitry and nonlinear processing circuitry. The adaptive signal slicing circuitry, coupled between the signal combining circuitry and the output terminal, slices the resultant signal to provide a sliced signal as the output signal. The nonlinear processing circuitry, coupled between the output terminal and the signal combining circuitry, nonlinearly processes at least a portion of the sliced signal to provide the processed signal.

In accordance with another embodiment of the presently claimed invention, a compensation circuit for reducing intersymbol interference (ISI) products within a data signal, includes input and output terminals, equalization and processing circuitry, signal combining circuitry and output processing circuitry. The input terminal conveys an input data signal including a first plurality of ISI products and corresponding to a detected data signal received via a signal transmission medium. The output terminal conveys an output data signal including a second plurality of ISI products which is smaller than the first plurality of ISI products. The equalization and processing circuitry, coupled between the input and output terminals, selectively equalizes and processes the input data signal and at least a portion of the output signal to provide a first processed signal. The signal combining circuitry, coupled to the input terminal and the equalization and processing circuitry, receives and subtracts the first processed signal and a second processed signal from the input data signal to provide a resultant signal. The output processing circuitry, coupled between the signal combining circuitry and the output terminal, processes the resultant signal to provide the output signal and the second processed signal.

In accordance with a related embodiment, the output processing circuitry includes adaptive signal slicing circuitry and nonlinear processing circuitry. The adaptive signal slicing circuitry, coupled between the signal combining circuitry and the output terminal, slices the resultant signal to provide a sliced signal as the output signal. The nonlinear processing circuitry, coupled between the output terminal and the signal combining circuitry, nonlinearly processes at least a portion of the sliced signal to provide the second processed signal.

In accordance with still another embodiment of the presently claimed invention, a compensation circuit for reducing intersymbol interference (ISI) products within a data signal, includes input and output terminals, equalization and processing circuitry, signal combining circuitry and output processing circuitry. The input terminal conveys an input data signal including a first plurality of ISI products and corresponding to a detected data signal received via a signal transmission medium. The output terminal conveys an output data signal including a second plurality of ISI products which is smaller than the first plurality of ISI products. The equalization and processing circuitry, coupled between the input and output terminals, selectively equalizes and processes the input data signal and at least a portion of the output signal to provide a processed signal. The signal combining circuitry, coupled to the input terminal and the equalization and processing circuitry, receives and subtracts the processed signal from the input data signal to provide a resultant signal. The output processing circuitry, coupled between the signal combining circuitry and the output terminal, processes the resultant signal to provide the output signal.

In accordance with a related embodiment, the output processing circuitry includes adaptive signal slicing circuitry, coupled between the signal combining circuitry and the output terminal, that slices the resultant signal to provide a sliced signal as the output signal.

In accordance with yet another embodiment of the presently claimed invention, a compensation circuit for reducing intersymbol interference (ISI) products within a data signal, includes input and output terminals, adaptive equalization circuitry, equalization and processing circuitry, signal combining circuitry and output processing circuitry. The input terminal conveys an input data signal including a first plurality of ISI products and corresponding to a detected data signal received via a signal transmission medium. The output terminal conveys an output data signal including a second plurality of ISI products which is smaller than the first plurality of ISI products. The adaptive equalization circuitry, coupled to the input terminal, adaptively equalizes the input data signal to provide an equalized signal. The equalization and processing circuitry, coupled between the input and output terminals, selectively equalizes and processes the input data signal and at least a portion of the output signal to provide a first processed signal. The signal combining circuitry, coupled to the adaptive equalization circuitry and the equalization and processing circuitry, receives and subtracts the first processed signal and a second processed signal from the equalized signal to provide a resultant signal. The output processing circuitry, coupled between the signal combining circuitry and the output terminal, processes the resultant signal to provide the output signal and the second processed signal.

In accordance with a related embodiment, the output processing circuitry includes adaptive signal slicing circuitry and nonlinear processing circuitry. The adaptive signal slicing circuitry, coupled between the signal combining circuitry and the output terminal, slices the resultant signal to provide a sliced signal as the output signal. The nonlinear processing circuitry, coupled between the output terminal and the signal combining circuitry, nonlinearly processes at least a portion of the sliced signal to provide the second processed signal.

DETAILED DESCRIPTION OF THE INVENTION

As an introduction to a more detailed discussion of an actual implementation of the presently claimed invention, a discussion is presented on the use of signal processing techniques for optical channels, fundamental performance limits and specific algorithms optimized for the optical channel with constrained architectures and/or other requirements. It begins with a simplified representation of the optical channel with respect to signal dispersion, which is sufficient to develop an optimized algorithm design. Discussed then are performance penalties incurred in the absence of appropriate signal processing techniques, followed by different classes of signal processing algorithm structures and corresponding optimized algorithms in the presence, as well as the absence, of symbol timing information. Different adaptation algorithm considerations are then noted. Initially, fiber and component nonlinearities are disregarded, following which, effects and mitigation of different fiber nonlinearities and cross-talk effects are considered.

It is assumed that the data signal modulation format is the simple but prevalent binary non-return to zero ("NRZ"), on-off keying ("OOK") with direct detection (e.g., as opposed to multi-level modulation, coherent detection or sub-carrier modulated systems). Thus, the transmit signal may be expressed as follows:

$$x(t) = \text{Re}\left\{\sum_i a_i h_T(t+iT) \cdot e^{j(\omega_c t + \phi_c(t))}\right\}$$
$$= \text{Re}\{\hat{x}(t)\}$$

where $h_T(t)$ represents the transmit pulse-shaping filter, $\{\alpha_i\}$ represents the sequence of data symbols, $\phi(t)=\omega_c t+\phi_c(t)$ represents the phase angle, $\omega_c$ represents the carrier frequency, $$\frac{d\phi_c(t)}{dt}$$

represents the chirp (typically with direct modulators), and $\hat{x}(t)$ is the corresponding complex signal.

Assuming only first-order polarization mode dispersion ("PMD") and ignoring nonlinearity effects, the signal at the input of the photodetector for the two orthogonal PMD signal modes can be expressed as follows:

$$s_{o,1}(t)=\text{Re}\{\hat{x}(t)*(h_c(t)e^{j\omega_c t})\}+n_1(t)=\text{Re}\{S_{o,1}(t)\}+n_1(t)$$

$$s_{o,2}(t)=\text{Re}\{\hat{x}(t+\tau)*(h_c(t)e^{j\omega_c t})\}+n_2(t)=\text{Re}\{S_{o,2}(t)\}+n_2(t)$$

where $h_c(t) \to H_c(f)=e^{-j\alpha f^2}$, $$\alpha = \pi D(\lambda) L \frac{\lambda^2}{c}$$

and $S_{o,1}(t), S_{o,2}(t)$ are the corresponding complex analytic signals, $n_1(t), n_2(t)$, are the Amplifier Spontaneous Emission (ASE) noise, and $D(\lambda)$, L are the linear delay coefficient and fiber length, respectively. (For purposes of simplifying the analysis, the extinction ratio has been disregarded.)

The output of the photodetector (with first-order PMD effects only) is as follows:

$$s_e(t)=\alpha_1(|S_{o,1}(t)+n_1(t)|^2+\alpha|S_{o,2}(t)+n_2(t)|^2)+n(t)$$

with n(t) assumed Gaussian with variance $N_0/2$ and accounts for thermal and shot noise.

This can be expanded to the following:

$$s_e(t) = \alpha_1[\sum_{i,k} a_i a_k (h_T(t+iT)e^{j\phi_c(t)}*h_c(t)) \cdot (h_T(t+kT)e^{-j\phi_c(t)}*h_c^*(t)) +$$
$$\alpha \sum_{i,k} a_i a_k (h_T(t+\tau+iT)e^{j\phi_c(t+\tau)}*h_c(t)) \cdot$$
$$(h_T(t+\tau+kT)e^{-j\phi_c(t+\tau)}*h_c^*(t)) +$$
$$2\alpha_1 \text{Re}[S_{o,1}(t)n_1^*(t)+\alpha S_{o,2}(t)n_2^*(t)] +$$
$$|n_1(t)|^2 + |n_2(t)|^2 + n(t)$$

For now, we will denote $$N(t)=2\alpha_1 Re[S_{o,1}(t)n_1^*(t)+\alpha S_{o,2}(t)n_2^*(t)]+|n_1(t)|^2+|n_2(t)|^2+n(t)$$

which is colored noise. Generally, we will ignore the terms $|n_1(t)|^2, |n_2(t)|^2$ in which case N(t) is Gaussian. This noise may also be non-stationary if the signal waveforms are considered to be a random (as opposed to deterministic) process.

Assuming $\phi_c(t)$ remains relatively constant during a dispersed symbol time interval, this may be further simplified to:

$$s_e(t) = \qquad\qquad\qquad\qquad\qquad\qquad\text{(EQ. 1)}$$
$$\alpha_1 \sum_{i,j} a_i a_j [p(t+iT)p^*(t+jT)\alpha p(t+\tau+iT)p^*(t+\tau+jT)] +$$
$$N(t)$$

or equivalently, $$s_e(t) = \alpha_1 \sum_{i,j} a_i a_j [p_{i,j}(t)+\alpha p_{i,j}(t+\tau)] + N(t)$$
$$= s_{e,sig}(t) + N(t)$$

where $p(t)=h_T(t)*h_c(t)$ (the data symbol pulse p(t) is the convolution ("*") of the transmit pulse-shaping filter transfer function $h_T(t)$ and the chromatic dispersion $h_c(t)$) and $p_{i,j}(t)=p(t+iT)p^*(t+jT)$.

Equation EQ. 1 is the key manifestation of dispersion (simplified form), which needs to be equalized or mitigated. There are two special cases of the more general scenario set forth above, which may simplify the analysis. The first case is where $p_{i,j}(t)=0, i \neq j$; generally equivalent to no chromatic dispersion, and the pulse broadening is due to PMD and laser chirp, in which case equation EQ. 1 as set forth above may be simplified to the following:

$$s_e(t) = \alpha_1 \sum_i a_i (p^2(t+iT)+\alpha p^2(t+\tau+iT)) + N(t)$$

The second case is where there is no PMD, in which case equation EQ. 1 can be simplified to:

$$s_e(t) = \alpha_1 \sum_{i,j} a_i a_j p(t+iT) p^*(t+jT) + N(t)$$

Different measures can be taken to estimate the loss due to dispersion and may range from a simple computation based upon a coarse estimate to a more difficult computation based upon a more elaborate estimate. These measures can be considered in more detail as follows.

Delay spread: This is a coarse but readily computable quantity. The pulse broadening at distance z can be expressed as follows:

$$T_z = T_0 \sqrt{(1+\kappa\beta_2 z/T_0^2)^2 + (1+W_0^2 T_0^2)(\beta_2 z/T_0^2)^2} + \tau$$

Root mean square ("RMS") and peak distortion criteria and bit error rate ("BER") computation: The peak distortion criterion provides the worst case ISI distortion, which may generally occur with a very low probability. If a classical receiver uses a simple low-pass filter (typically matched to the transmit pulse shape) with impulse response $h_R(t)$, the signal at the output of this filter can be expressed as follows:

$$r_e(t) = \alpha_1 \sum_{i,j} a_i a_j [q_{i,j}(t) + \alpha q_{i,j}(t+\tau)] + n(t),$$

where $q_{i,j}(t) = p_{i,j}(t) * h_R(t)$.

The peak distortion criterion may then be expressed as follows:

$$D_p = \alpha_1 E_a \max_{t \in [0,T]} \sum_{(i,j) \neq (0,0)} |q_{i,j}(t) + \alpha q_{i,j}(t+\tau)|$$

and for a symbol interval:

$$D_p(t) = \alpha_1 E_a \sum_{(i,j) \neq (0,0)} |q_{i,j}(t) + \alpha q_{i,j}(t+\tau)|; \ 0 \leq t \leq T.$$

The RMS distortion criterion may also be simply computed. With the RMS distortion criteria, the BER may be computed assuming the ISI to be Gaussian distributed.

BER computation with saddle-point approximation: This is a more accurate measure of the BER in the presence of ISI without assuming the ISI to be Gaussian distributed.

Different performance bounds can be considered for purposes of determining performance limits of electronic signal processing. The two more common upper bounds of performance include the matched filter bound and the maximum likelihood sequence detection bound. When $N(t) \approx n(t)$, i.e., when ASE noise is negligible as is possible with metro systems, the matched filter bound (MFB) can be expressed as follows:

$$SNR_{MFB} = \frac{\alpha_1^2 E_d \|p^2(t) + \alpha p^2(t+\tau)\|^2}{N_0/2}$$

where $E_d$ is the energy per data symbol.

The upper bound of the probability of bit errors can then be expressed as follows:

$$P_e \leq Q\left(\sqrt{\frac{SNR_{MFB}}{4}}\right)$$

When considering ASE noise as the dominant, noise but ignoring the higher order powers of the ASE noise, the noise N(t) is colored and Gaussian. The MFB in this case may be expressed as:

$$SNR_{MFB} = \frac{\alpha_1^2 E_d \int_{t=0}^{T} (p^2(t) + \alpha p^2(t+\tau)) dt}{2N_0'}$$

It may be noted that, interestingly, an optimal matched filter can be a simple "integrate and dump" type of filter.

In accordance with the presently claimed invention, non-linear equalization in the form of decision feedback equalization (DFE) is used, and is applied based upon a rewritten form of equation EQ. 1. as follows (where $a_0$ is the data symbol sought to be detected, e.g., the present data symbol):

$$s_{e,sig}(t) = \alpha_1 a_0 [p_{0,0}(t) + \alpha p_{0,0}(t+\tau)] + \quad (T1)$$

$$\alpha_1 \sum_{i \geq 0, j > 0} a_i a_j [p_{i,j}(t) + \alpha p_{i,j}(t+\tau)] + \quad (T2)$$

$$\alpha_1 a_0 \sum_{j < 0} a_j [p_{0,j}(t) + \alpha p_{0,j}(t+\tau)] + \quad (T3)$$

$$\alpha_1 \sum_{i < 0, j < 0} a_i a_j [p_{i,j}(t) + \alpha p_{i,j}(t+\tau)] + \quad (T4)$$

$$2\alpha_1 \sum_{i > 0, j < 0} a_i a_j [p_{i,j}(t) + \alpha p_{i,j}(t+\tau)] \quad (T5)$$

Note that while the non-white, or colored, characteristic of the additive noise N(t) is not considered explicitly, it may be assumed that the application of a linear filter whitens the noise and is subsumed within $s_{e,sig}(t)$.

Figure 5:
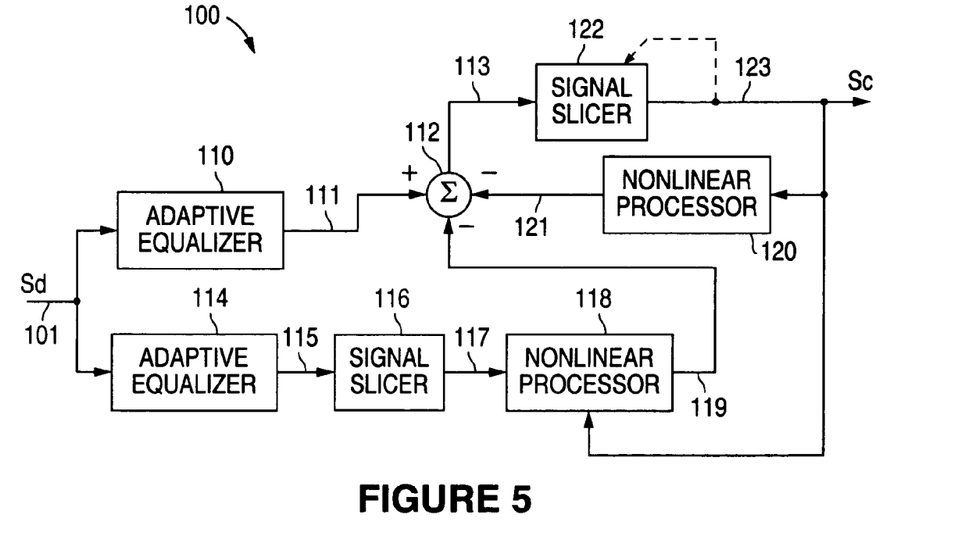
FIG. 5 is a functional block diagram of a compensation circuit in accordance with one embodiment of the presently claimed invention.

Referring to FIG. 5, a compensation circuit for reducing intersymbol inference products within an electrical data signal corresponding to a detected optical data signal received via an optical fiber in accordance with one embodiment of the presently claimed invention includes, in various combinations as will be discussed below: an adaptive equalizer 110; a signal combiner 112; another adaptive equalizer 114; a signal slicer 116; a nonlinear signal processor 118; another nonlinear signal processor 120; and another signal slicer 122; all interconnected substantially as shown. The electrical data signal 101, corresponding to the detected optical data signal, generally in the form of a voltage signal generated by a transimpedance amplifier (not shown) from the electrical current signal produced by the photodetector, contains a sequence of data symbols. Such data symbol sequence includes a present data symbol, a sequence of past data symbols and a sequence of future data symbols. The present data symbol is that which is sought to be detected correctly at any given point in time, while the past data symbols are those which have preceded the present data symbol, and the future data symbols are those which will follow the present data symbol. This electrical data signal 101 is processed by the first adaptive equalizer 110 in accordance with well known adaptive equalization techniques. The resulting adaptively equalized signal 111 is provided to the signal combining circuit 112. The equalization provided by this adaptive equalizer 110 substantially removes data signal component T2 representing the ISI product of the future data symbol sequence as defined above.

The electrical data signal 101 is also adaptively equalized by the other adaptive equalizer 114 in accordance with well known adaptive equalization techniques. That resulting equalized signal 115 is processed, e.g., detected, in the signal slicer 116. The resulting sliced signal 117 corresponds to the ISI products of the future data symbol sequence portion ("i>0") of data signal component T5 as defined above, and is provided to the nonlinear signal processor 118. (This slicing, or thresholding, function has the effect of causing this signal 117 to represent tentative decisions as to the expected values of future data symbols within the sequence of data symbols of the electrical data signal 101.) The nonlinear signal processor 118 (discussed in more detail below) processes this sliced signal 117 together with another sliced signal 123 (discussed in more detail below) which represents the ISI product of the past data symbol sequence portion ("j<0") of data signal component T5 as defined above. The resulting processed signal 119, therefore, approximately duplicates data signal component T5 representing the ISI products of the past and future data symbol sequences as defined above, and is provided to the signal combining circuit 112.

Another nonlinear signal processor 120 also processes this second sliced signal 123 to produce a processed signal 121 in which data signal component T4 representing the ISI product of the past data symbol sequence as defined above is approximately duplicated. This signal 121 is also provided to the signal combining circuit 112.

The signal combining circuit 112 combines its input signals 111, 119, 121 by subtracting from the first adaptively equalized signal 111 the first nonlinearly processed signal 119 and the second nonlinearly processed signal 121. The resultant signal 113, therefore, has had data signal components T2, T4, and T5 substantially removed, thereby leaving only the desired data signal component T1 (i.e., the present, or desired data symbol) and data signal component T3 which represents the ISI product of the past data symbol sequence.

The second signal slicer 122 slices this signal 113, thereby substantially removing data signal component T3, to produce the second sliced signal 123. In accordance with a preferred embodiment of the presently claimed invention, the output signal slicer 122 is an adaptive signal slicer in which the sliced output signal 123 is fed back for purposes of adaptively modifying the threshold used within the signal slicer 122. This adaptive threshold function can be achieved in accordance with any of a number of conventional techniques and is discussed in more detail below.

Alternatively, and in more specific detail, the operation of the circuitry of FIG. 5 can be described as follows. To compensate the pre-cursor ISI term T2, a linear, pre-cursor equalizer in the form of adaptive equalizer 110 is used. This filter is preferably a feedforward transversal filter. For example, adaptive equalizer 110 can be a symbol-spaced transversal filter with the following impulse response:

$$h_B(t) = \sum_{k=-M}^{M} d_k \delta(t-kT)$$

The criterion for selecting the precise filter $h_B(t)$ so as to maximize its response is as follows:

$$\rho = \frac{[(p_{0,0}(t) + \alpha p_{0,0}(t+\tau)) * h_B(t)]^2}{\sum_{i \geq 0, j > 0} ([p_{i,j}(t) + \alpha p_{i,j}(t+\tau)] * h_B(t))^2}$$

$$= \frac{(\overline{P}^{[0,0]} \underline{d})^2}{\sum_{i \geq 0, j > 0} (\overline{P}^{[i,j]} \underline{d})^2}$$

The ISI term T5 is compensated by a combination of different filter structures. This includes a nonlinear processor 118, which produces a scaled sum based on the designed weighting coefficients of the filter $$h_C(t) = \sum_k f_k \delta(t-kT)$$

of products of symbols. The output of the nonlinear processor 118 is a sequence of the following form:

$$\sum_{i>0, j<0} f_{(i,j)} \hat{a}_i \hat{a}_j.$$

Estimates of the past symbols $\{\hat{a}_j\}_{j<0}$ are obtained from the output signal slicer 122, which serves as a Final Decision block, while estimates of the future symbols $\{\hat{a}_i\}_{i>0}$ are obtained from the other signal slicer 116, which serves as a Tentative Decision block. This Tentative Decision block can be a simple two-level slicer. Due to the possibility of error propagation as the decisions are only tentative, improved performance may be expected using a three-level slicer with the middle level indicating an erasure or no-decision.

The associated adaptive equalizer 114 is preferably adaptive and fractionally-spaced, but can also be fixed and symbol-spaced as well in which case this filter 114 is of the form $$h_A(t) = \sum_k g_k \delta(t-kT).$$

This filter, or bank of filters, together with the slicer 116 predicts the future symbols. Thus, a simple design for $h_A(t)$ is a bank of filters such that the filters are matched to $\{p_{k,k}(t) + \alpha p_{k,k}(t+\tau)\}_{k>0}$ for nearly maximizing the signal-to-noise ratio ("SNR") for the future symbols.

The ISI term T3 which also contains the desired symbol, albeit scaled by past symbols, is compensated by the output signal slicer 122, which preferably includes a two-level slicer and can also contain a finite impulse response ("FIR") filter with appropriate weightings of past symbols. The output of such a FIR filter is used to approximate the following term:

$$\sum_{j<0} a_j [p_{0,j}(t) + \alpha p_{0,j}(t+\tau)]$$

It should be noted that the threshold in this slicer 122 can be adapted based on a table as a function of past decisions that have been made. Such table can have up to $2^M$ entries where M is the length of the post-cursor ISI in number of symbols.

The ISI term T4 is compensated using another nonlinear processor 120, which produces a scaled sum based on the designed weighting coefficients of the filter $$h_D(t) = \sum_k h_k \delta(t - kT)$$

of products of symbols. The output of this nonlinear processor 120 is a sequence of the following form:

$$\sum_{i<0, j<0} h_{(i,j)} \hat{a}_i \hat{a}_j.$$

Estimates of past symbols $\{a_j\}_{j<0}$ are obtained from the Final Decision block 122.

The weighting coefficients for the adaptive equalizers 110, 114 as well as the weighting coefficients for the nonlinear filters 118, 120 can be designed with least-mean square ("LMS") or zero-forcing criteria.

Consistent with the principles of the present invention, it should be appreciated that the data signal component-specific nature of the compensation provided, as discussed above, need not necessarily be performed upon all four of the undesired data signal components (T2, T3, T4 and T5). For example, compensation can be limited or applied primarily to the following individual data signal components or combinations of data signal components as follows (with no significance attached to the order in which they are listed): signal components T2 and T3; signal components T2, T3 and T4; signal components T2, T3 and T5; signal components T2 and T4; signal components T2, T4 and T5; and signal components T2 and T5. Similarly, compensation can be limited or applied primarily as follows: signal components T3 and T4; signal components T3, T4 and T5; and signal components T3 and T5. Further similarly, compensation can be limited or applied primarily as follows: signal component T4; signal components T4 and T5; and signal component T5.

In those cases in which fewer than all four undesired data signal components are compensated, based upon the foregoing discussion and the circuit of FIG. 5, it should be understood that the circuit connections would be modified as follows. Where no compensation is to be provided for data signal component T2, the first adaptive equalizer 110 is not used or is bypassed and the electrical data signal 101 is provided directly to the "positive" input terminal of the signal combining circuit 112. Where no compensation for data signal component T3 is to be provided, the second signal slicer 122 is a fixed-threshold signal slicer instead of an adaptive signal slicer (discussed in more detail below).

Where no compensation for data signal component T4 is to be provided, the second nonlinear signal processor 120 is not used and no connection is made to the corresponding "negative" input to the signal combining circuit 112. Similarly, where no compensation for data signal component T5 is to be provided, the second adaptive equalizer 114, the first signal slicer 116 and first nonlinear signal processor 118 are not used and no connection is made to the corresponding "negative" input to the signal combining circuit 112.

Based upon the foregoing discussion, a number of principles, characteristics and features of the present invention should be evident. First, the beneficial data signal compensation provided in accordance with the present invention is not limited to electrical data signals detected from optical data signals. Indeed, such compensation techniques can be applied to any electrical data signal corresponding to a detected data signal received via a signal transmission medium, with an optical medium merely being one example.

Second, the signal model used for purposes of determining how best to apply compensation to the various components of the data signal is not limited to that presented above. The signal model discussed above has been presented as an example for purposes of illustrating the more general feature of the present invention, i.e., selective application of compensation to individual, discrete data signal components.

For example, the topology, or architecture, of the circuit and functions as depicted in FIG. 5 advantageously allows compensation to be selectively applied to individual, discrete data signal components by performing four major functions. The circuit branch containing the first adaptive equalizer 110 processes the electrical data signal 101 in such a manner as to substantially remove one distinct signal component representing an ISI product of some portion of the data symbol sequence (e.g., a portion of the future data symbol sequence, as discussed for the example above). The circuit branch containing equalization and processing circuitry in the form of the other adaptive equalizer 114, signal slicer 116 and nonlinear signal processor 118 approximately duplicates an ISI product of another portion of the data symbol sequence (e.g., portions of the past and future data symbol sequences, as discussed for the example above) for removal by subtraction within the signal combiner 112 from the compensated signal 111 provided by the first adaptive equalizer 110. The circuit branch containing output processing circuitry in the form of the other signal slicer 122 and nonlinear signal processor 120 approximately duplicates an ISI product of still another portion of the data symbol sequence (e.g., another portion of the past data symbol sequence, as discussed for the example above) for removal by subtraction within the signal combiner 112 from the compensated signal 111 provided by the first adaptive equalizer 110.

Figure 6A:
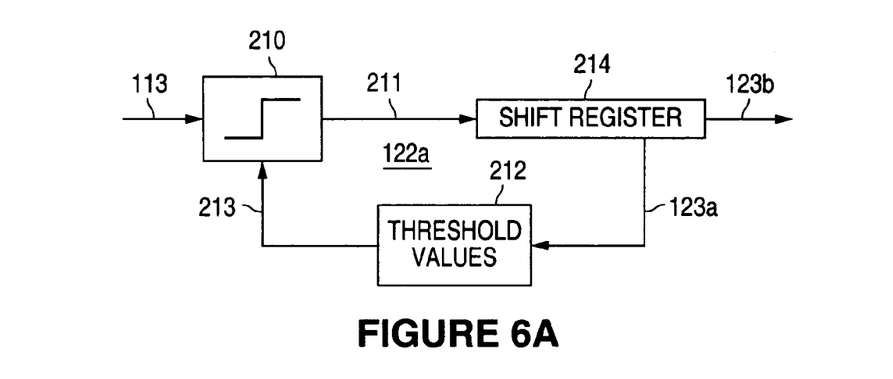
FIGS. 6A, 6B, 6C and 6D are functional block diagrams of examples of adaptive signal slicers suitable for use in the circuit of FIG. 5.

Referring to FIG. 6A, one example of an adaptive signal slicer 122a suitable for use in the circuit of FIG. 5 has a slicing, or threshold, circuit 210 having a threshold which is controlled or provided by a threshold control signal 213 from a threshold value circuit 212. The sliced data 211 is provided to a shift register 214, the contents 123a of which are used to determine the threshold control signal 213 provided by the threshold value circuit 212. In one embodiment, this threshold value circuit 212 can be a memory circuit, such as a random access memory or lookup table, which uses the shift register output 123a as an address signal for selecting the appropriate output 213 for use as the threshold data or control signal.

Figure 6B:
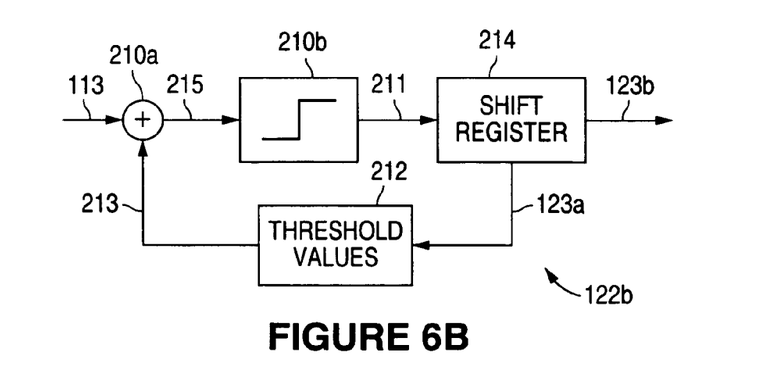

Referring to FIG. 6B, another example of an adaptive signal slicer 122b suitable for use in the circuit of FIG. 5 has a signal summing, or scaling, stage 210a in which the incoming signal 113 is summed, or scaled in accordance, with the threshold control signal 213 from the threshold value circuit 212. The scaled signal 215 is sliced by the slicing, or threshold, circuit 210b using a fixed threshold. As before, the sliced data 211 is provided to a shift register 214, the contents 123a of which are used to determine the threshold control signal 213 provided by the threshold value circuit 212. (Alternatively, in place of the scaling stage 210a, threshold control signal 213 and threshold value circuit 212, a variable gain stage, gain control signal and gain control circuit, respectively (not shown), can be used, whereby the variable gain stage would amplify or attenuate the incoming signal 113 in accordance with the gain control signal provided by the gain control circuit.)

Figure 6C:
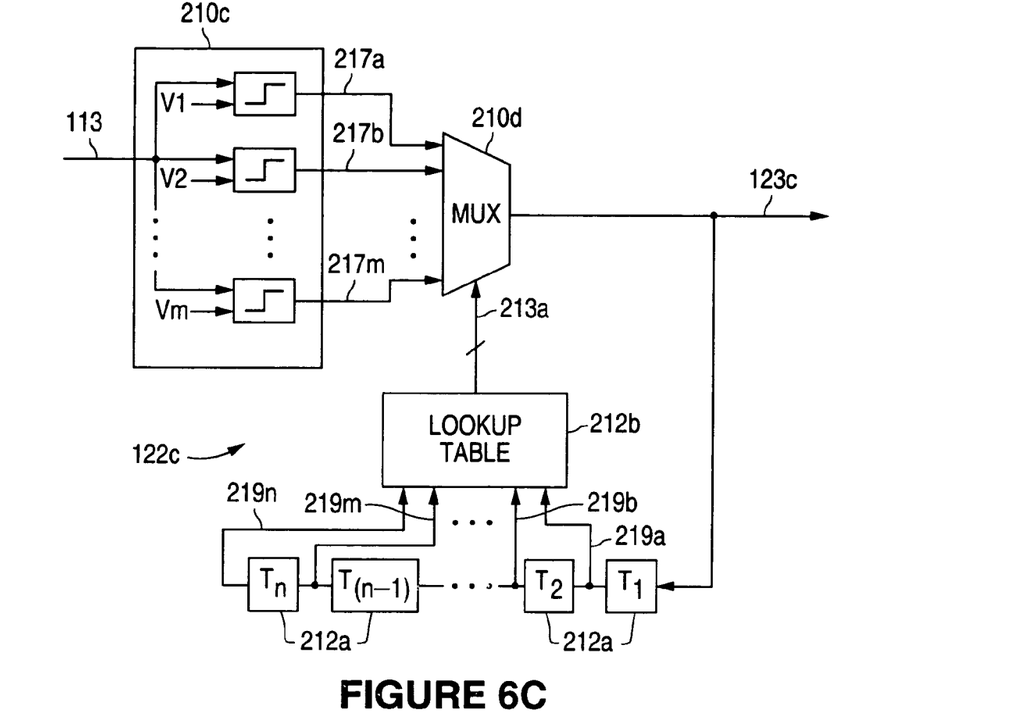

Referring to FIG. 6C, still another example of an adaptive signal slicer 122c suitable for use in the circuit of FIG. 5 has a multiple-level (e.g., m levels) slicer 210c in which the incoming signal is compared against m thresholds V1, V2, V3, . . . , Vm, with one of the m sliced signals 217a, 217b, . . . , 217m selected by a multiplexor 210d. The output 123c of the multiplexor 210d is sequentially delayed by a number of delay elements 212a (e.g., a shift register), with the resultant delayed signals 219a, 219b, . . . , 219n used to address a memory element (e.g., a lookup table) 212b, the output 213a of which controls the multiplexor 210d.

Figure 6D:
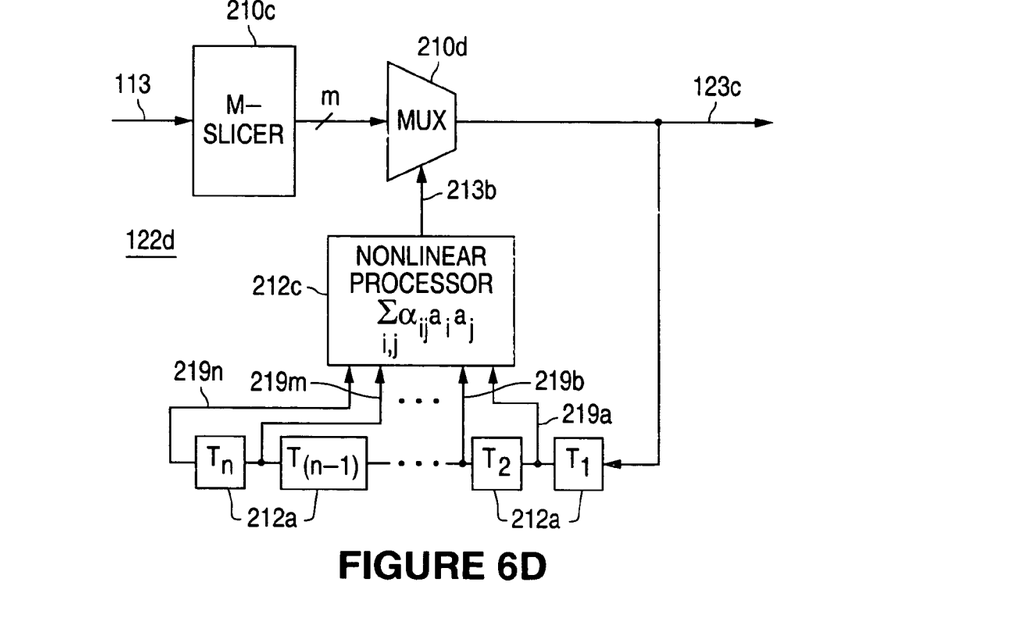

Referring to FIG. 6D, yet another example of an adaptive signal slicer 122d suitable for use in the circuit of FIG. 5 also has the multiple-level slicer 210c and multiplexor 210d. In this circuit 122d, the delay elements 212a in cooperation with a nonlinear processor 212c use the delayed signals 219a, 219b, . . . , 219n to produce a sum of products, the result 213b of which controls the multiplexor 210d.

Figure 7A:
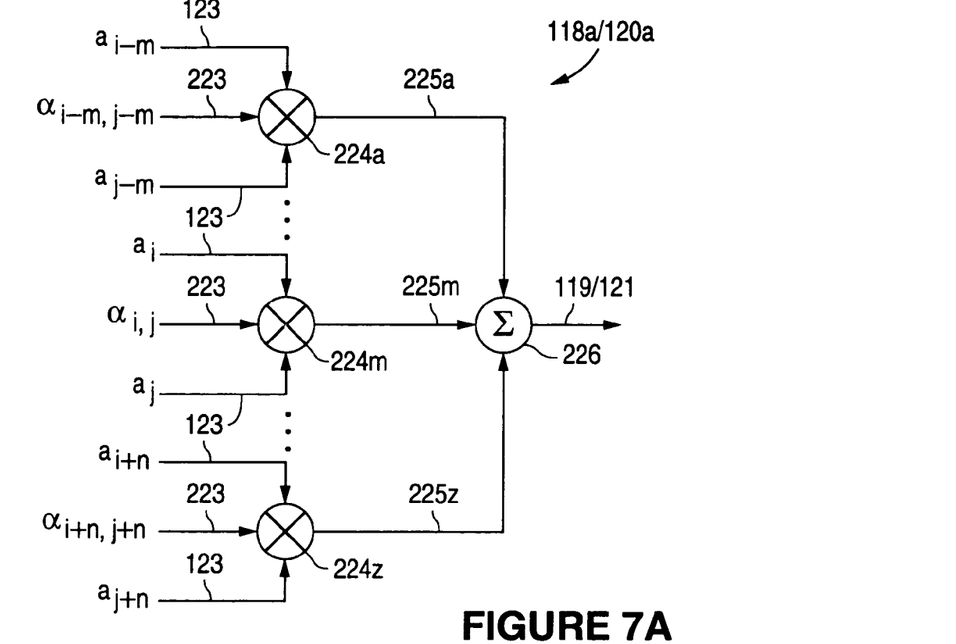
FIGS. 7A and 7B are functional block diagrams of examples of nonlinear signal processors suitable for use in the circuit of FIG. 5.

Referring to FIG. 7A, one example of a nonlinear signal processing circuit 118a/120a suitable for use as the nonlinear signal processors 118, 120 in the circuit of FIG. 5 includes a number of multiplier circuits 224 for generating the signal products 225 within data signal components T4 and T5, and a summing circuit 226 for summing such signal products 225. The respective sliced data signal components 123 are multiplied together, along with corresponding scaling data 223, in accordance with the ISI equation set forth above.

Figure 7B:
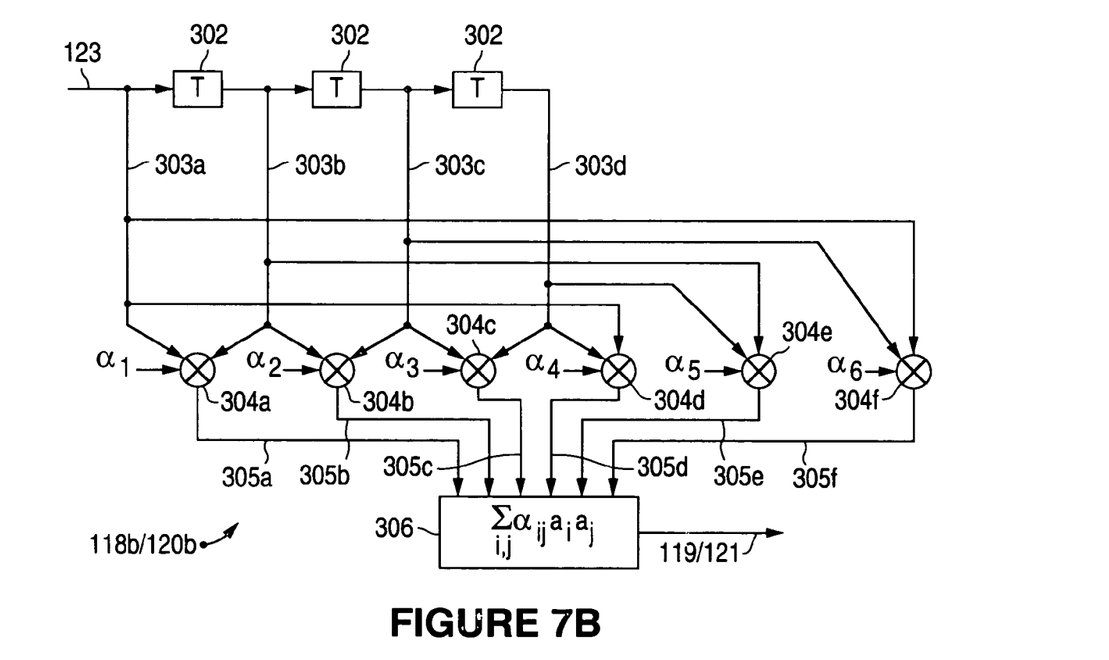

Referring to FIG. 7B, another example of a nonlinear signal processing circuit 118b/120b suitable for use as the nonlinear signal processors 118, 120 in the circuit of FIG. 5 also includes a number of multiplier circuits 304 for generating signal products 305 by multiplying time-delayed versions 303 of the input signal 301 (delayed by delay elements 302), and a summing circuit 306 for summing such signal products 305.

Figure 8:
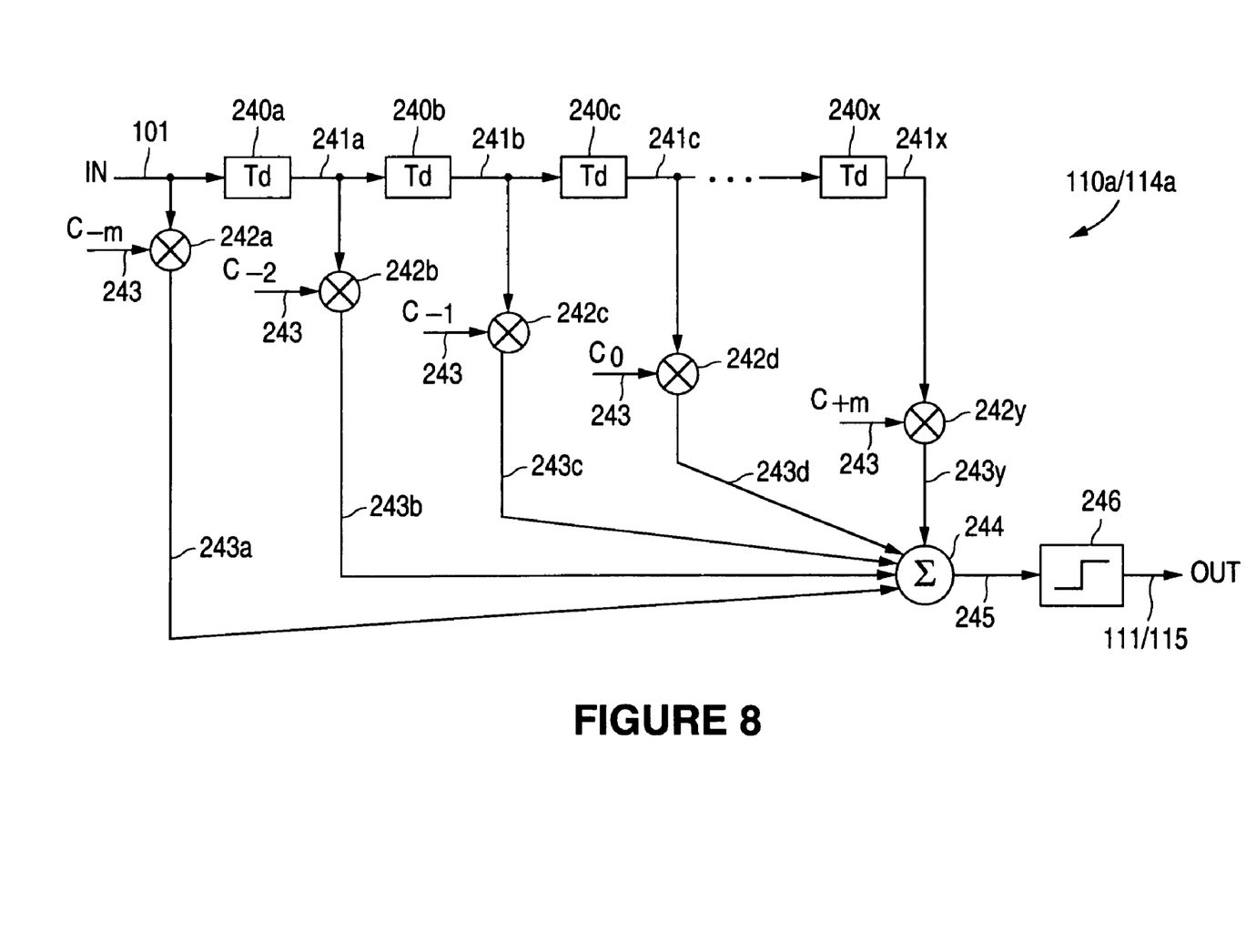
FIG. 8 is a functional block diagram of one example of a feedforward equalizer suitable for use in the circuit of FIG. 5.

Referring to FIG. 8, an adaptive equalizer circuit 110a/114a suitable for use as the adaptive equalizers 110, 114 in the circuit of FIG. 5 can be a conventional feedforward equalizer as shown. Preferably, it is a fractionally-spaced transversal equalizer in which each of the respective time delay intervals Td is less than the period of one data symbol. In accordance with well known techniques, the incoming data signal 101 is progressively delayed by time delay elements 240. The tapped signals 101, 241 are individually multiplied by respective equalizer coefficients 243 within the multipliers 242. The resulting signals 243 are then summed in a summer 244, with the summed signal 245 sliced by a signal slicer 246 to produce the equalized output signal 111/115 (FIG. 5).

As will be readily understood by those of ordinary skill in the art, the individual circuit elements and functions discussed herein are well known and understood, and can be readily constructed and practiced in numerous ways using either analog or digital implementations as well as combinations of both. For example, analog implementations of the nonlinear signal processing circuit 118a/120a of FIG. 7 or adaptive equalizer circuit 110a/114a of FIG. 8 could use well known Gilbert cell circuitry for the multipliers 224, 242, simple voltage summing circuitry for the adders 226, 244, and passive filters (with substantially constant group delay) for the delay elements 240. Digital implementations of these circuits 118a/120a, 110a/114a could use well known combinations of binary registers and counters for the multipliers 224, 242, combinations of binary logic circuits for the adders 226, 244, and binary shift registers or flip flops for the delay elements 240.

As will be further understood, while the present invention has been discussed in the context of implementations using discrete electronic circuitry (preferably in the form of one or more integrated circuit chips), the functions of any part of such circuitry may be implemented using one or more appropriately programmed processors, depending upon the data symbol rates to be processed.

As will be still further understood, while the present invention has been discussed in the context of the detection of signals received via signal transmission media in the form of optical fiber, the compensation principles and techniques discussed herein are also applicable to and useful for the detection of signals received via other forms of dispersive media.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including a compensation circuit for reducing intersymbol interference (ISI) products within a data signal, comprising:

an input terminal that conveys an input data signal including a first plurality of ISI products and corresponding to a detected data signal received via a signal transmission medium;

an output terminal that conveys an output data signal including a second plurality of ISI products which is smaller than said first plurality of ISI products;

first adaptive equalization circuitry, coupled to said input terminal, that adaptively equalizes said input data signal to provide a first equalized signal;

equalization and processing circuitry, coupled between said input and output terminals, that selectively equalizes and processes said input data signal and at least a portion of said output data signal to provide a processed signal, and includes second adaptive equalization circuitry, coupled to said input terminal, that adaptively equalizes said input data signal to provide a second equalized signal, signal slicing circuitry, coupled to said second adaptive equalization circuitry, that slices said second equalized signal to provide a sliced signal, and nonlinear processing circuitry, coupled between said signal slicing circuitry and said output terminal, that nonlinearly processes said sliced signal and said at least a portion of said output data signal to provide said processed signal;

signal combining circuitry, coupled to said first adaptive equalization circuitry and said equalization and processing circuitry, that receives and subtracts said processed signal from said first equalized signal to provide a resultant signal; and output processing circuitry, coupled between said signal combining circuitry and said output terminal, that processes said resultant signal to provide said output data signal.

2. The apparatus of claim 1, wherein said second adaptive equalization circuitry comprises linear equalization circuitry.

3. The apparatus of claim 1, wherein said second adaptive equalization circuitry comprises fractionally-spaced transversal equalization circuitry.

4. An apparatus including a compensation circuit for reducing intersymbol interference (ISI) products within a data signal, comprising:

an input terminal that conveys an input data signal including a first plurality of ISI products and corresponding to a detected data signal received via a signal transmission medium;

an output terminal that conveys an output data signal including a second plurality of ISI products which is smaller than said first plurality of ISI products;

first adaptive equalization circuitry, coupled to said input terminal, that adaptively equalizes said input data signal to provide a first equalized signal;

equalization and processing circuitry, coupled between said input and output terminals, that selectively equalizes and processes said input data signal and at least a portion of said output data signal to provide a processed signal, and includes second adaptive equalization circuitry, coupled to said input terminal, that adaptively equalizes said input data signal to provide a second equalized signal, signal slicing circuitry, coupled to said second adaptive equalization circuitry, that slices said second equalized signal to provide a sliced signal, and nonlinear processing circuitry, coupled between said signal slicing circuitry and said output terminal, that nonlinearly processes said sliced signal and said at least a portion of said output data signal to provide said processed signal;

signal combining circuitry, coupled to said first adaptive equalization circuitry and said equalization and processing circuitry, that receives and subtracts said processed signal from said first equalized signal to provide a resultant signal; and output processing circuitry, coupled between said signal combining circuitry and said output terminal, that processes said resultant signal to provide said output data signal, and includes signal slicing circuitry, coupled between said signal combining circuitry and said output terminal, that slices said resultant signal to provide a sliced signal as said output data signal, wherein said signal slicing circuitry comprises adaptive signal slicing circuitry.

5. The apparatus of claim 4, wherein said second adaptive equalization circuitry comprises linear equalization circuitry.

6. The apparatus of claim 4, wherein said second adaptive equalization circuitry comprises fractionally-spaced transversal equalization circuitry.

7. An apparatus including a compensation circuit for reducing intersymbol interference (ISI) products within a data signal, comprising:

an input terminal that conveys an input data signal including a first plurality of ISI products and corresponding to a detected data signal received via a signal transmission medium;

an output terminal that conveys an output data signal including a second plurality of ISI products which is smaller than said first plurality of ISI products;

equalization and processing circuitry, coupled between said input and output terminals, that selectively equalizes and processes said input data signal and at least a portion of said output data signal to provide a first processed signal, and includes adaptive equalization circuitry, coupled to said input terminal, that adaptively equalizes said input data signal to provide an equalized signal, signal slicing circuitry, coupled to said adaptive equalization circuitry, that slices said equalized signal to provide a sliced signal, and nonlinear processing circuitry, coupled between said signal slicing circuitry and said output terminal, that nonlinearly processes said sliced signal and said at least a portion of said output data signal to provide said first processed signal;

signal combining circuitry, coupled to said input terminal and said equalization and processing circuitry, that receives and subtracts said first processed signal and a second processed signal from said input data signal to provide a resultant signal; and output processing circuitry, coupled between said signal combining circuitry and said output terminal, that processes said resultant signal to provide said output data signal and said second processed signal.

8. The apparatus of claim 7, wherein said adaptive equalization circuitry comprises linear equalization circuitry.

9. The apparatus of claim 7, wherein said adaptive equalization circuitry comprises fractionally-spaced transversal equalization circuitry.

10. An apparatus including a compensation circuit for reducing intersymbol interference (ISI) products within a data signal, comprising:

an input terminal that conveys an input data signal including a first plurality of ISI products and corresponding to a detected data signal received via a signal transmission medium;

an output terminal tat conveys an output data signal including a second plurality of ISI products which is smaller than said first plurality of ISI products;

equalization and processing circuitry, coupled between said input and output terminals, that selectively equalizes and processes said input data signal and at least a portion of said output data signal to provide a first processed signal, and includes adaptive equalization circuitry, coupled to said input terminal, that adaptively equalizes said input data signal to provide an equalized signal, signal slicing circuitry, including adaptive signal slicing circuitry and coupled to said adaptive equalization circuitry, that slices said equalized signal to provide a sliced signal, and nonlinear processing circuitry, coupled between said signal slicing circuitry and said output terminal, that nonlinearly processes said sliced signal and said at least a portion of said output data signal to provide said first processed signal;

signal combining circuitry, coupled to said input terminal and said equalization and processing circuitry, that receives and subtracts said first processed signal and a second processed signal from said input data signal to provide a resultant signal; and output processing circuitry, coupled between said signal combining circuitry and said output terminal, that processes said resultant signal to provide said output data signal and said second processed signal, and includes signal slicing circuitry, coupled between said signal combining circuitry and said output terminal, that slices said resultant signal to provide a sliced signal as said output data signal, and nonlinear processing circuitry, coupled between said output terminal and said signal combining circuitry, that nonlinearly processes at least a portion of said sliced signal to provide said second processed signal.

11. The apparatus of claim 10, wherein said adaptive equalization circuitry comprises linear equalization circuitry.

12. The apparatus of claim 10, wherein said adaptive equalization circuitry comprises fractionally-spaced transversal equalization circuitry.

13. An apparatus including a compensation circuit for reducing intersymbol interference (ISI) products within a data signal, comprising:

an input terminal that conveys an input data signal including a first plurality of ISI products and corresponding to a detected data signal received via a signal transmission medium;

an output terminal that conveys an output data signal including a second plurality of ISI products which is smaller than said first plurality of ISI products;

equalization and processing circuitry, coupled between said input and output terminals, that selectively equalizes and processes said input data signal and at least a portion of said output data signal to provide a processed signal, and includes adaptive equalization circuitry, coupled to said input terminal, that adaptively equalizes said input data signal to provide an equalized signal, signal slicing circuitry, coupled to said adaptive equalization circuitry, that slices said equalized signal to provide a sliced signal, and nonlinear processing circuitry, coupled between said signal slicing circuitry and said output terminal, that nonlinearly processes said sliced signal and said at least a portion of said output data signal to provide said processed signal;

signal combining circuitry, coupled to said input terminal and said equalization and processing circuitry, that receives and subtracts said processed signal from said input data signal to provide a resultant signal; and output processing circuitry, coupled between said signal combining circuitry and said output terminal, that processes said resultant signal to provide said output data signal.

14. The apparatus of claim 13, wherein said adaptive equalization circuitry comprises linear equalization circuitry.

15. The apparatus of claim 13, wherein said adaptive equalization circuitry comprises fractionally-spaced transversal equalization circuitry.

16. An apparatus including a compensation circuit for reducing intersymbol interference (ISI) products within a data signal, comprising:

an input terminal that conveys an input data signal including a first plurality of ISI products and corresponding to a detected data signal received via a signal transmission medium;

an output terminal that conveys an output data signal including a second plurality of ISI products which is smaller than said first plurality of ISI products;

equalization and processing circuitry, coupled between said input and output terminals, that selectively equalizes and processes said input data signal and at least a portion of said output data signal to provide a processed signal, and includes adaptive equalization circuitry, coupled to said input terminal, that adaptively equalizes said input data signal to provide an equalized signal, signal slicing circuitry, coupled to said adaptive equalization circuitry, that slices said equalized signal to provide a sliced signal, and nonlinear processing circuitry, coupled between said signal slicing circuitry and said output terminal, that nonlinearly processes said sliced signal and said at least a portion of said output data signal to provide said processed signal;

signal combining circuitry, coupled to said input terminal and said equalization and processing circuitry, that receives and subtracts said processed signal from said input data signal to provide a resultant signal; and output processing circuitry, coupled between said signal combining circuitry and said output terminal, that processes said resultant signal to provide said output data signal, and includes signal slicing circuitry, coupled between said signal combining circuitry and said output terminal, that slices said resultant signal to provide a sliced signal as said output data signal, wherein said signal slicing circuitry comprises adaptive signal slicing circuitry.

17. The apparatus of claim 16, wherein said adaptive equalization circuitry comprises linear equalization circuitry.

18. The apparatus of claim 16, wherein said adaptive equalization circuitry comprises fractionally-spaced transversal equalization circuitry.

19. An apparatus including a compensation circuit for reducing intersymbol interference (ISI) products within a data signal, comprising:

an input terminal that conveys an input data signal including a first plurality of ISI products and corresponding to a detected data signal received via a signal transmission medium;

an output terminal that conveys an output data signal including a second plurality of ISI products which is smaller than said first plurality of ISI products;

first adaptive equalization circuitry, coupled to said input terminal, that adaptively equalizes said input data signal to provide a first equalized signal;

equalization and processing circuitry, coupled between said input and output terminals, tat selectively equalizes and processes said input data signal and at least a portion of said output data signal to provide a first processed signal, and includes second adaptive equalization circuitry, coupled to said input terminal, that adaptively equalizes said input data signal to provide a second equalized signal, signal slicing circuitry, coupled to said second adaptive equalization circuitry, that slices said second equalized signal to provide a sliced signal, and nonlinear processing circuitry, coupled between said signal slicing circuitry and said output terminal, that nonlinearly processes said sliced signal and said at least a portion of said output data signal to provide said first processed signal:

signal combining circuitry, coupled to said first adaptive equalization circuitry and said equalization and processing circuitry, that receives and subtracts said first processed signal and a second processed signal from said first equalized signal to provide a resultant signal; and output processing circuitry, coupled between said signal combining circuitry and said output terminal, that processes said resultant signal to provide said output data signal and said second processed signal.

20. The apparatus of claim 19, wherein said second adaptive equalization circuitry comprises linear equalization circuitry.

21. The apparatus of claim 19, wherein said second adaptive equalization circuitry comprises fractionally-spaced transversal equalization circuitry.

22. An apparatus including a compensation circuit for reducing intersymbol interference (ISI) products within a data signal, comprising:

an input terminal that conveys an input data signal including a first plurality of ISI products and corresponding to a detected data signal received via a signal transmission medium;

an output terminal that conveys an output data signal including a second plurality of ISI products which is smaller than said first plurality of ISI products;

first adaptive equalization circuitry, coupled to said input terminal, that adaptively equalizes said input data signal to provide a first equalized signal;

equalization and processing circuitry, coupled between said input and output terminals, that selectively equalizes and processes said input data signal and at least a portion of said output data signal to provide a first processed signal, and includes second adaptive equalization circuitry, coupled to said input terminal, that adaptively equalizes said input data signal to provide a second equalized signal, signal slicing circuitry, including adaptive signal slicing circuitry and coupled to said second adaptive equalization circuitry, that slices said second equalized signal to provide a sliced signal, and nonlinear processing circuitry, coupled between said signal slicing circuitry and said output terminal, that nonlinearly processes said sliced signal and said at least a portion of said output data signal to provide said first processed signal;

signal combining circuitry, coupled to said first adaptive equalization circuitry and said equalization and processing circuitry, that receives and subtracts said first processed signal and a second processed signal from said first equalized signal to provide a resultant signal; and output processing circuitry, coupled between said signal combining circuitry and said output terminal, that processes said resultant signal to provide said output data signal and said second processed signal, and includes signal slicing circuitry, coupled between said signal combining circuitry and said output terminal, that slices said resultant signal to provide a sliced signal as said output data signal, and nonlinear processing circuitry, coupled between said output terminal and said signal combining circuitry, that nonlinearly processes at least a portion of said sliced signal to provide said second processed signal.

23. The apparatus of claim 22, wherein said second adaptive equalization circuitry comprises linear equalization circuitry.

24. The apparatus of claim 23, wherein said second adaptive equalization circuitry comprises fractionally-spaced transversal equalization circuitry.

25. An apparatus including a compensation circuit for reducing intersymbol interference (ISI) products within a data signal, comprising:

input means for conveying an input data signal including a first plurality of ISI products and corresponding to a detected data signal received via a signal transmission medium;

output means for conveying an output data signal including a second plurality of ISI products which is smaller than said first plurality of ISI products;

first adaptive equalizer means for adaptively equalizing said input data signal to provide a first equalized signal;

equalizer and processor means for selectively equalizing and processing said input data signal and at least a portion of said output data signal to provide a processed signal, and including second adaptive equalizer means for adaptively equalizing said input data signal to provide a second equalized signal, signal slicer means for slicing said second equalized signal to provide a sliced signal, and nonlinear processor means for nonlinearly processing said sliced signal and said at least a portion of said output data signal to provide said processed signal;

signal combiner means for receiving and subtracting said processed signal from said first equalized signal to provide a resultant signal; and output processor means for processing said resultant signal to provide said output data signal.

26. An apparatus including a compensation circuit for reducing intersymbol interference (ISI) products within a data signal, comprising:

input means fox conveying an input data signal including a first plurality of ISI products and corresponding to a detected data signal received via a signal transmission medium;

output means for conveying an output data signal including a second plurality of ISI products which is smaller than said first plurality of ISI products;

first adaptive equalizer means for adaptively equalizing said input data signal to provide a first equalized signal;

equalizer and processor means for selectively equalizing and processing said input data signal and at least a portion of said output data signal to provide a processed signal, and including second adaptive equalizer means for adaptively equalizing said input data signal to provide a second equalized signal, signal slicer means for slicing said second equalized signal to provide a sliced signal, and nonlinear processor means for nonlinearly processing said sliced signal and said at least a portion of said output data signal to provide said processed signal;

signal combiner means for receiving and subtracting said processed signal from said first equalized signal to provide a resultant signal; and output processor means for processing said resultant signal to provide said output data signal, and including signal slicer means for slicing said resultant signal to provide a sliced signal as said output data signal.

27. An apparatus including a compensation circuit for reducing intersymbol interference (ISI) products within a data signal, comprising:

input means for conveying an input data signal including a first plurality of ISI products and corresponding to a detected data signal received via a signal transmission medium;

output means for conveying an output data signal including a second plurality of ISI products which is smaller than said first plurality of ISI products;

equalizer and processor means for selectively equalizing and processing said input data signal and at least a portion of said output data signal to provide a first processed signal, and including adaptive equalizer means for adaptively equalizing said input data signal to provide an equalized signal, signal slicer means for slicing said equalized signal to provide a sliced signal, and nonlinear processor means for nonlinearly processing said sliced signal and said at least a portion of said output data signal to provide said first processed signal;

signal combiner means for receiving and subtracting said first processed signal and a second processed signal from said input data signal to provide a resultant signal; and output processor means for processing said resultant signal to provide said output data signal and said second processed signal.

28. An apparatus including a compensation circuit for reducing intersymbol interference (ISI) products within a data signal, comprising:

input means for conveying an input data signal including a first plurality of ISI products and corresponding to a detected data signal received via a signal transmission medium;

output means for conveying an output data signal including a second plurality of ISI products which is smaller than said first plurality of ISI products;

equalizer and processor means for selectively equalizing and processing said input data signal and at least a portion of said output data signal to provide a first processed signal, and including adaptive equalizer means for adaptively equalizing said input data signal to provide an equalized signal, signal slicer means for slicing said equalized signal to provide a sliced signal, and nonlinear processor means for nonlinearly processing said sliced signal and said at least a portion of said output data signal to provide said first processed signal;

signal combiner means for receiving and subtracting said first processed signal and a second processed signal from said input data signal to provide a resultant signal; and output processor means for processing said resultant signal to provide said output data signal and said second processed signal, and including signal slicer means for slicing said resultant signal to provide a sliced signal as said output data signal, and nonlinear processor means for nonlinearly processing at least a portion of said sliced signal to provide said second processed signal.

29. An apparatus including a compensation circuit for reducing intersymbol interference (ISI) products within a data signal, comprising:

input means for conveying an input data signal including a first plurality of ISI products and corresponding to a detected data signal received via a signal transmission medium;

output means for conveying an output data signal including a second plurality of ISI products which is smaller than said first plurality of ISI products;

equalizer and processor means for selectively equalizing and processing said input data signal and at least a portion of said output data signal to provide a processed signal, and including adaptive equalizer means for adaptively equalizing said input data signal to provide an equalized signal, signal slicer means for slicing said equalized signal to provide a sliced signal, and nonlinear processor means for nonlinearly processing said sliced signal and said at least a portion of said output data signal to provide said processed signal;

signal combiner means for receiving and subtracting said processed signal from said input data signal to provide a resultant signal; and output processor means for processing said resultant signal to provide said output data signal.

30. An apparatus including a compensation circuit for reducing intersymbol interference (ISI) products within a data signal, comprising:

input means for conveying an input data signal including a first plurality of ISI products and corresponding to a detected data signal received via a signal transmission medium;

output means for conveying an output data signal including a second plurality of ISI products which is smaller than said first plurality of ISI products;

equalizer and processor means for selectively equalizing and processing said input data signal and at least a portion of said output data signal to provide a processed signal, and including adaptive equalizer means for adaptively equalizing said input data signal to provide an equalized signal, signal slicer means for slicing said equalized signal to provide a sliced signal, and nonlinear processor means for nonlinearly processing said sliced signal and said at least a portion of said output data signal to provide said processed signal;

signal combiner means for receiving and subtracting said processed signal from said input data signal to provide a resultant signal; and output processor means for processing said resultant signal to provide said output data signal, and including signal slicer means for slicing said resultant signal to provide a sliced signal as said output data signal.

31. An apparatus including a compensation circuit for reducing intersymbol interference (ISI) products within a data signal, comprising:

input means for conveying an input data signal including a first plurality of ISI products and corresponding to a detected data signal received via a signal transmission medium;

output means for conveying an output data signal including a second plurality of ISI products which is smaller than said first plurality of ISI products;

first adaptive equalizer means for adaptively equalizing said input data signal to provide a first equalized signal;
equalizer and processor means for selectively equalizing and processing said input data signal and at least a portion of said output data signal to provide a first processed signal, and including
    second adaptive equalizer means for adaptively equalizing said input data signal to provide a second equalized signal,
    signal slicer means for slicing said second equalized signal to provide a sliced signal, and
    nonlinear processor means for nonlinearly processing said sliced signal and said at least a portion of said output data signal to provide said first processed signal;
signal combiner means for receiving and subtracting said first processed signal and a second processed signal from said first equalized signal to provide a resultant signal; and
output processor means for processing said resultant signal to provide said output data signal and said second processed signal.

32. An apparatus including a compensation circuit for reducing intersymbol interference (ISI) products within a data signal, comprising:
input means for conveying an input data signal including a first plurality of ISI products and corresponding to a detected data signal received via a signal transmission medium;
output means for conveying an output data signal including a second plurality of ISI products which is smaller than said first plurality of ISI products;
first adaptive equalizer means for adaptively equalizing said input data signal to provide a first equalized signal;
equalizer and processor means for selectively equalizing and processing said input data signal and at least a portion of said output data signal to provide a first processed signal, and including
    second adaptive equalizer means for adaptively equalizing said input data signal to provide a second equalized signal,
    signal slicer means for slicing said second equalized signal to provide a sliced signal, and
    nonlinear processor means for nonlinearly processing said sliced signal and said at least a portion of said output data signal to provide said first processed signal;
signal combiner means for receiving and subtracting said first processed signal and a second processed signal from said first equalized signal to provide a resultant signal; and
output processor means for processing said resultant signal to provide said output data signal and said second processed signal, and including
    signal slicer means for slicing said resultant signal to provide a sliced signal as said output data signal, and
    nonlinear processor means for nonlinearly processing at least a portion of said sliced signal to provide said second processed signal.

\* \* \* \* \*

UNITED STATES PATENT AND TRADEMARK OFFICE
CERTIFICATE OF CORRECTION

PATENT NO. : 7,031,383 B2
APPLICATION NO. : 10/117293
DATED : April 18, 2006
INVENTOR(S) : Abhijit g. Shanbhag et al.

It is certified that error appears in the above-identified patent and that said Letters Patent is hereby corrected as shown below:

Column 8,
Line 30, EQ. 1, delete " $s_e(t) = \alpha_1 \sum_{i,j} a_i a_j [p(t+iT)p^*(t+jT) \ \alpha p(t+\tau+iT)p^*(t+\tau+jT)] + N(t)$ "

and insert -- $s_e(t) = \alpha_1 \sum_{i,j} a_i a_j [p(t+iT)p^*(t+jT) + \alpha p(t+\tau+iT)p^*(t+\tau+jT)] + N(t)$ --.

Column 13,
Line 34, delete "$\{a_j\}_{j<0}$" and insert -- $\{\hat{a}_j\}_{j<0}$ --.

Column 18,
Line 55, delete "tat" and insert -- that --.

Column 20,
Line 64, delete "tat" and insert -- that --.

Column 22,
Line 47, delete "fox" and insert -- for --.

Signed and Sealed this

Eighteenth Day of July, 2006

JON W. DUDAS
*Director of the United States Patent and Trademark Office*